(12) United States Patent
Filer

(10) Patent No.: US 6,913,293 B1
(45) Date of Patent: Jul. 5, 2005

(54) SPIRAL SPLINE PIPE JOINT APPARATUS AND METHOD

(75) Inventor: John T. Filer, Siloam Springs, AR (US)

(73) Assignee: Pipelife Jet Stream Inc., Siloam Springs, AR (US)

( * ) Notice: Subject to any disclaimer, the term of this patent is extended or adjusted under 35 U.S.C. 154(b) by 0 days.

(21) Appl. No.: 10/313,299

(22) Filed: Dec. 5, 2002

(51) Int. Cl.[7] .............................................. F16L 37/24
(52) U.S. Cl. ...................................... 285/403; 285/305
(58) Field of Search ............................... 285/305, 318, 285/321, 403, 340, 332.2, 332.3

(56) References Cited

U.S. PATENT DOCUMENTS

| | | | |
|---|---|---|---|
| 1,464,386 A | | 8/1923 | Ingram |
| 1,820,644 A | | 5/1931 | Bach |
| 2,038,869 A | * | 4/1936 | Rader ....................... 285/289.3 |
| 2,038,870 A | * | 4/1936 | Rader et al. .............. 285/289.3 |
| 2,038,871 A | * | 4/1936 | Mueller et al. ........... 285/289.3 |
| 2,181,343 A | * | 11/1939 | Reimschissel ............... 285/339 |
| 2,346,051 A | | 4/1944 | Seamark |
| 2,403,368 A | * | 7/1946 | Howard .......................... 285/37 |
| 2,440,452 A | * | 4/1948 | Smith .......................... 285/317 |
| 2,665,931 A | | 1/1954 | Vegren |
| 2,777,718 A | | 1/1957 | Vegren |
| 2,983,779 A | * | 5/1961 | Dumire et al. ............. 174/75 C |
| 3,129,476 A | * | 4/1964 | Sindlinger .................. 285/403 |
| 3,245,702 A | * | 4/1966 | Smith .......................... 285/305 |
| 3,442,630 A | * | 5/1969 | Mueller et al. ............... 44/409 |
| 3,606,402 A | * | 9/1971 | Medney ....................... 285/305 |
| 3,625,551 A | * | 12/1971 | Branton et al. ............. 285/305 |
| 4,040,326 A | | 8/1977 | Breed |
| 4,253,687 A | * | 3/1981 | Maples ..................... 285/332.3 |
| 4,491,351 A | | 1/1985 | Galle, Jr. et al. |
| 4,697,947 A | * | 10/1987 | Bauer et al. ................... 403/14 |
| 5,813,705 A | * | 9/1998 | Dole .......................... 285/321 |
| 5,868,443 A | * | 2/1999 | Ungerman et al. ......... 285/369 |
| 6,102,447 A | * | 8/2000 | Aldridge ..................... 285/305 |
| 6,179,347 B1 | | 1/2001 | Dole et al. |
| 6,352,288 B1 | | 3/2002 | Calkins |
| 6,739,630 B2 | * | 5/2004 | Riedy ......................... 285/321 |

* cited by examiner

*Primary Examiner*—James M. Hewitt
(74) *Attorney, Agent, or Firm*—Keisling Pieper & Scott PLC; David B. Pieper; Trent C. Keisling

(57) ABSTRACT

A pipe joint apparatus and method using spiral groove halves formed on the nested surfaces of male and female pipe ends. The exterior half of the spiral groove is connected to an exit port. The interior half of the spiral groove has a proximal end recessed from edge of its pipe. Alignment of the pipes and partial insertion of the spline allows for a threaded pipe connection that may be screwed or unscrewed to overcome the pressure for the gasket seal. Full insertion of the spline to engage the exit port locks the spline in position and the interior half's proximal end prohibits the unscrewing of the pipe joint. The pipe ends may be easily disconnected by pulling the spline out of the exit port to unscrew the pipe sections or fully removing the spline to separate the pipe ends. A gasket is used to form a sealed joint.

2 Claims, 9 Drawing Sheets

SPIRAL SPLINE PIPE JOINT APPARATUS AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to the field of pipe joints in general. In particular, the present invention relates specifically to the use of a spline for quickly creating strong pipe joints. Known art may be found in U.S. Class 285, subclasses 305, 318, 330, and 371 as well as in other classes and subclasses.

2. Description of the Known Art

As will be appreciated by those skilled in the art, a spline may be used to engage and lock together pipes in a releasable configuration. In regards to an improvement in this type of joint, several United States patents should be considered for providing a basic understanding of the level of skill in their different and respective areas of art. These include U.S. Pat. No. 1,464,386, issued to Ingram on Aug. 7, 1923; U.S. Pat. No. 1,820,644, issued to Bach on Aug. 25, 1931; U.S. Pat. No. 2,346,051, issued to Seamark on Apr. 4, 1944; U.S. Pat. No. 2,665,931, issued to Vegen on Jan. 12, 1954; U.S. Pat. No. 2,777,718, issued to Vegren on Jan. 15, 1957; U.S. Pat. No. 4,040,326, issued to Breed on Aug. 9, 1977; U.S. Pat. No. 4,491,351, issued to Galle on Jan. 1, 1985; U.S. Pat. No. 6,179,347, issued to Dole on Jan. 30, 2001; and U.S. Pat. No. 6,352,288, issued to Calkins on Mar. 5, 2002. Each of these patents is hereby incorporated by reference.

U.S. Pat. No. 1,464,386 issued to Ingram on Aug. 7, 1923 discloses a joint. This patent describes the use of a wire inserted into mating grooves on an interior and exterior pipe in order to secure the pipes together. The wire is passed through an opening in the outer pipe to be inserted into the groove fully enclosing the circumference of the groove. A radial socket is provided on the interior pipe to catch the end of the wire so that the pipe may be turned to pull the wire into the groove. A further alternative embodiment describes utilizing a wire spring which may be expanded by an inserted member in order to engage the two cylindrical pipe members.

U.S. Pat. No. 1,820,644 issued to Bach on Aug. 25, 1931 describes a coupling device. This patent describes an improved method for coupling stems or shanks of rotary tools utilizing a helical lay or groove for receiving a helical member corresponding to the size of the helical groove.

U.S. Pat. No. 2,346,051 issued to Seamark on Apr. 4, 1944 describes pipe and other couplings. This patent describes the use of a cylindrical coupling sleeve utilizing a packing ring for sealing a pipe within a coupling and then utilizing a helical buttress thread adapted for the admission of an open helix of steel or other metal alloy utilizing a serrated vase for gripping an inserted pipe.

Thus, it may be seen that these prior art patents are very limited in their teaching and utilization, and an improved pipe joint is needed to overcome these limitations. What is needed is a Spiral Spline Pipe Joint Apparatus and Method for providing an improved selectively engaged pipe joint.

SUMMARY OF THE INVENTION

The present invention is directed to an improved spiral spline point joint apparatus and method. In accordance with one exemplary embodiment of the present invention, a spiral spline pipe joint is provided for connecting sections of pipe. The spiral spline joint apparatus includes a female joint end defining an end opening having an internal surface defining a first spiral spline groove section. A male joint end defining a protrusion with an external surface defining a second spiral spline groove section is inserted into the female joint end. The groove sections are aligned to form a spline accepting aperture. A spline is inserted into the spline accepting aperture to threadably engage the male joint end and the female joint end. A spline locking apparatus for locking the pipes together with the spline is taught along with the use of a gasket and gasket seats for sealing the sections of pipe together. Methods of the present invention include the process for assembling the spiral spline pipe joint, locking the spiral spline pipe joint, and disassembling the spiral spline pipe joint. Further use of the spiral nature of the spline to provide a threaded engagement is taught, and the use of these threads to overcome the pressure for the gasket is also provided.

Advantages of the present invention include: the ability to releasably engage sections of pipe with a simple inexpensive connection, the ability to form repetitive joints with a minimal amount of material cost, the ability to use the leverage advantages of threads to overcome gasket pressure, the ability to form a centered joint with equal pressure on both sections of pipe around the joint the ability to form a strong joint using multiple rotations of a spline, the ability to eliminate a continuous circumferential weakness; the ability to lock the pipes together to rate as a single unit, the ability to use an increased strengthened bell for supporting the weight of several lengths of pipe, easy alignment of the pipes for insertion of the spline, the ability to rotate only one pipe to achieve alignment, the easy use of a well screen without further adapters.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
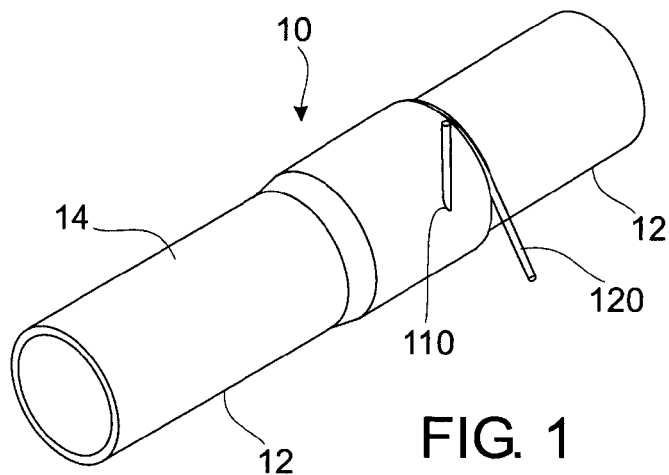
FIG. 1 is a top isometric view of an exemplary embodiment of the present invention.
Figure 2:
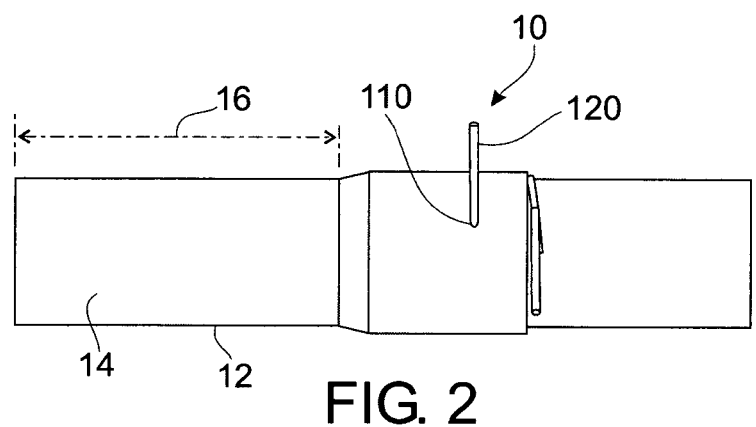
FIG. 2 is a side view of the embodiment of FIG. 1.
Figure 3:
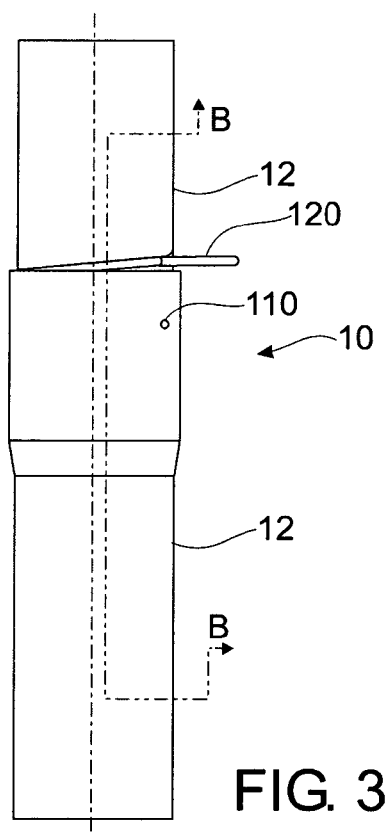
FIG. 3 is a side view of the embodiment of FIG. 1.
Figure 4:
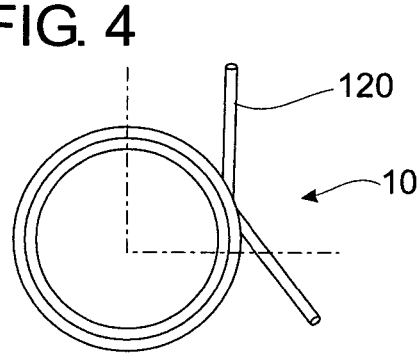
FIG. 4 is a top view of the embodiment of FIG. 1.

As an overview of the invention shown in FIGS. 1–32 of the drawings, note that the present invention is directed to an exiting spiral spline pipe joint apparatus 10 and method using a mating male joint end 24 and female joint end 54. This coupling design incorporates first and second corresponding groove sections 34, 84 and a spline 120 to assemble and lock the joint 10 together. The female joint end 54 is a larger diameter pipe or bell section with a first half of a spiral groove section 84 formed on the surface of the interior diameter 80 of the pipe flange 68. The first section 84 or half of the spiral groove has a distal end 88 connected to an exit port 110. The male joint end 24 has a smaller diameter 20 with a second mating half of the spiral groove section 34 formed on its exterior surface diameter 33 at an internal end 36 at a location distal from the leading edge at the external end 38 of the segment of pipe 12. AS shown in the preferred embodiment, the external surface diameter 33 of the male joint end 24 is the same as the pipe external diameter 22. A gasket 112 is used to seal the outside of the male pipe end 24 to the inside of the female pipe end 54 if a sealed joint is needed. This use of a spiral spline 120 overcomes several disadvantages of the prior art designs using a continuous circumferential groove that weakens the wall of the pipe 12 and provides a fracture point in both the bell flange 68 and the inserted portions at the male joint end 24 of the pipe 12. These disadvantages are overcome by the use of the spiral spline 120 described in this invention.

Advantages for assembling the joint 10 are also provided. The leading edge or internal end 36 of the male pipe end 24 is inserted into the female pipe end 54 and the groove halves 34, 84 are aligned so that a spline 120 may be inserted into the aligned spiral groove aperture 104. Partial insertion of the spline 120 allows for a threaded pipe connection such that the two sections of pipe 54, 24 may be screwed together to overcome the pressure for the gasket 112 seal. The pipes 24, 54 may also be unscrewed when only a partial insertion of the spline 120 is utilized. Full insertion of the spline 120 to extend out of the exit port 110 locks the spline 120 in position and the internal end 36 of the spiral groove 34 on the male pipe end 24 prohibits the unscrewing of the male pipe from the female pipe. In addition, the external end 38 of the spiral groove on the male pipe end 24 prohibits the joint 10 from being screwed in too tightly and allows for expansion room inside the pipe joint 10 between the male pipe end 24 and the internal end of the bell 68 on the female joint end 54. The pipe ends 24, 54 may be easily disconnected by partially pulling the spline 120 out of the exit port 110 to use the spline 120 as a thread to unscrew the pipe sections or fully removing the spline 120 to simply separate the pipe ends 24, 54. These improvements are described in detail as noted herein.

FIGS. 1 through 5 of the drawings show an assembled exiting spiral spline pipe joint apparatus 10. This pipe joint apparatus 10 is utilized to join segments of pipe 12. Each pipe 12 includes a pipe body 14 which has a pipe length 16 and a pipe thickness 18. The pipe thickness 18 is defined by the pipe internal diameter 20 and the pipe external diameter 22.

Shown in FIGS. 1–5 is the utilization of the spline 120 which is wound spirally into the pipe joint apparatus 10. The spline 120 is shown having a round shape with a spline diameter 122 and having an elongated spline length 124 (FIG. 25) sufficient for insertion all the way through the pipe joint apparatus 10 to lock the apparatus 10 together. The preferred spline 120 is 0.235 inches in diameter although other shapes for the spline 120 may also be utilized with the appropriate changes. As shown by the cutaway view in FIG. 5, a gasket 112 is utilized to seal the pipe joint apparatus 10.

Figure 6:
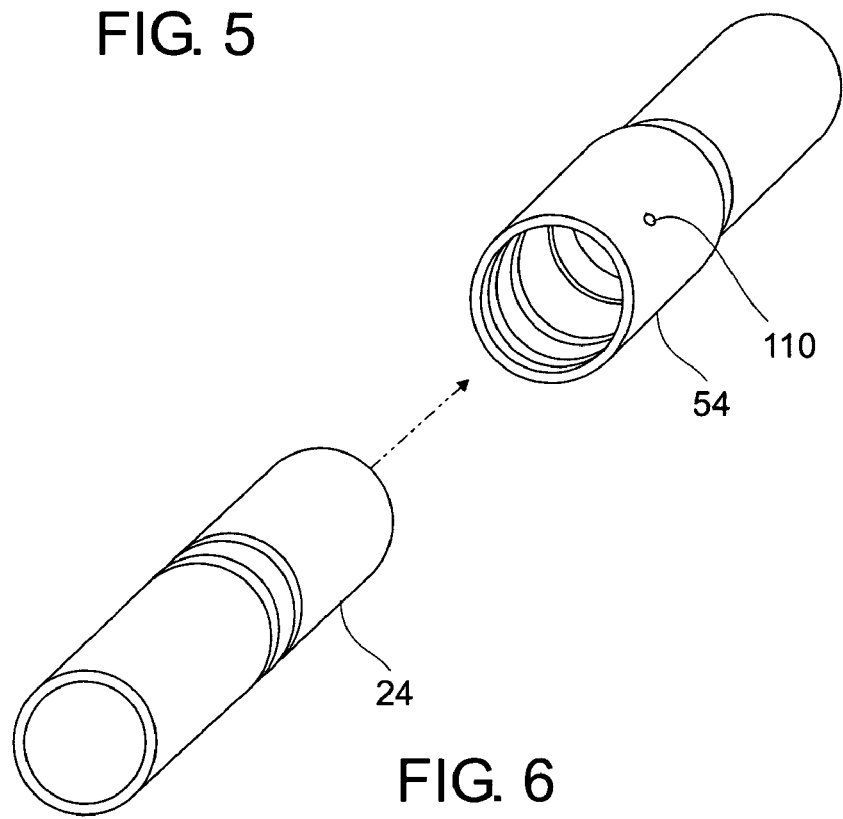
FIG. 6 is a top front isometric view of the female joint end and the male joint end.
Figure 7:
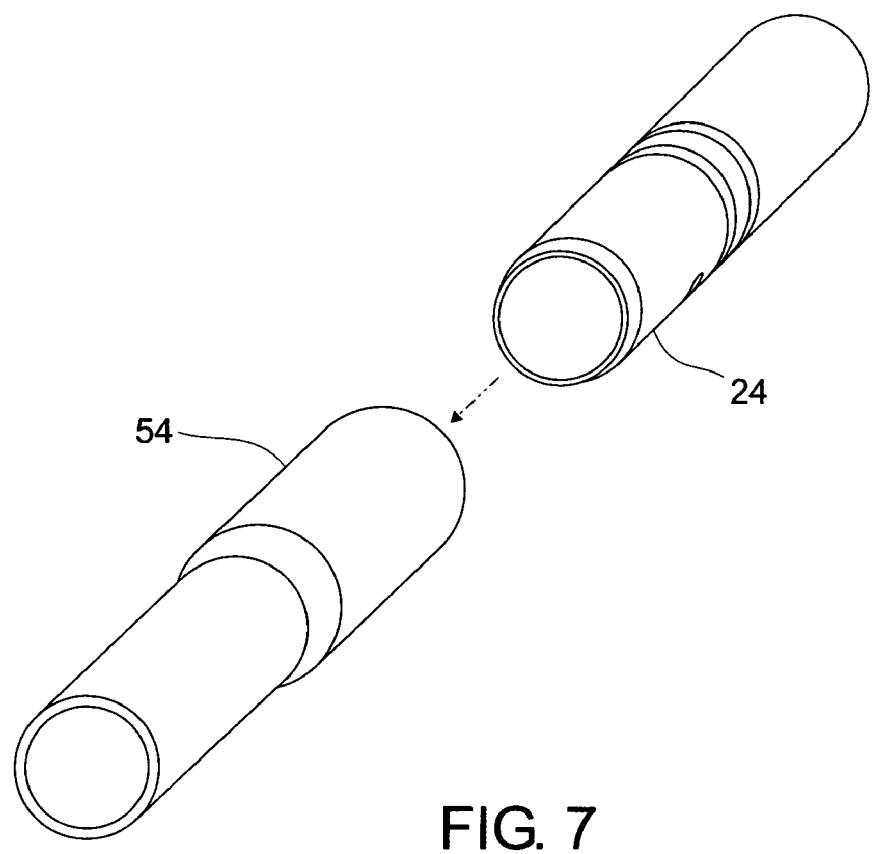
FIG. 7 is a top back isometric view of the female joint end and the male joint end.
Figure 8:
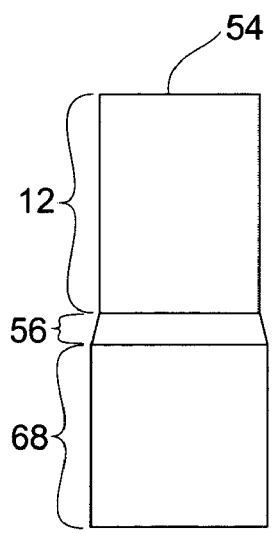
FIG. 8 is a front view of the female joint end.

FIGS. 6 and 7 of the drawings show an exploded view of pipe ends for the female joint end 54 and the male joint end 24 of the apparatus 10. Each of these ends 24, 54 will be described in greater detail with their associated drawings.

Figure 16:
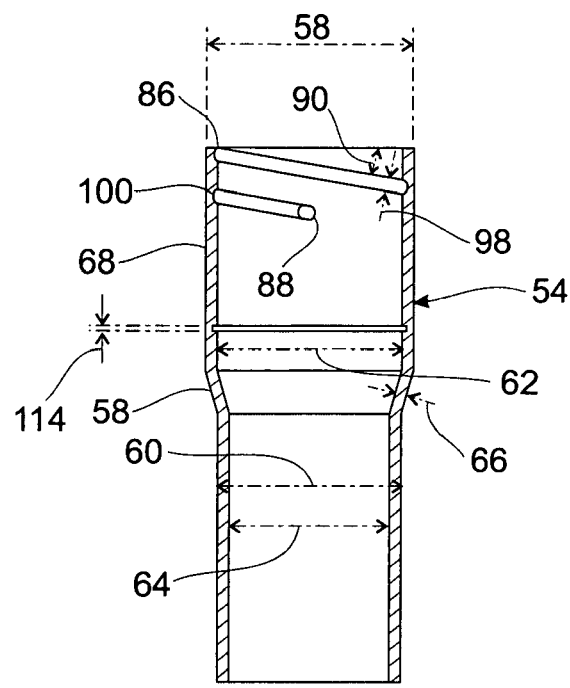
FIG. 16 is a cutaway view of the female joint end of FIG. 11 along line A—A.
Figure 17:
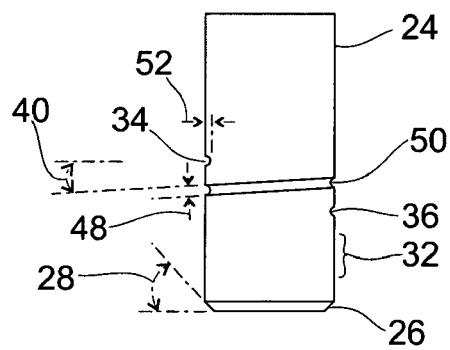
FIG. 17 is a front view of the male joint end.
Figure 18:
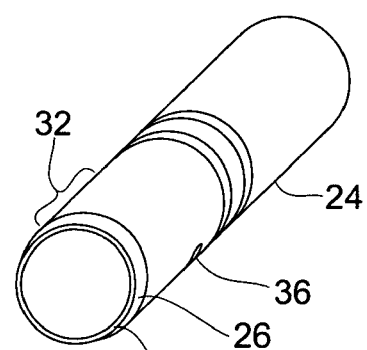
FIG. 18 is a top perspective view of the male joint end.
Figure 19:
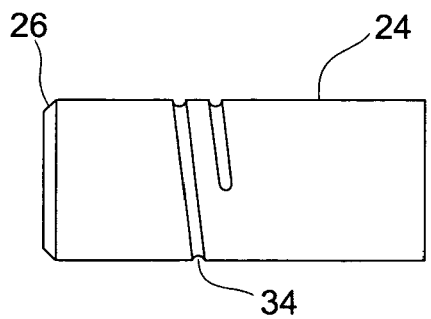
FIG. 19 is a right side view of the male joint end.
Figure 20:
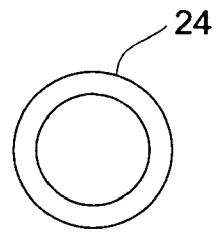
FIG. 20 is a top view of the male joint end.
Figure 21:
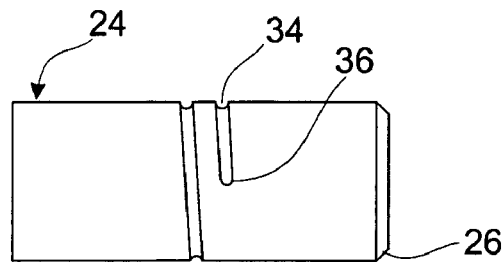
FIG. 21 is a left side view of the male joint end.
Figure 22:
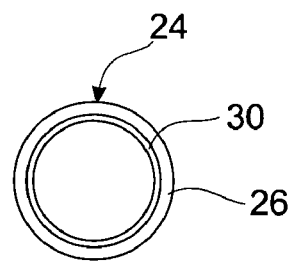
FIG. 22 is a bottom view of the male joint end.
Figure 23:
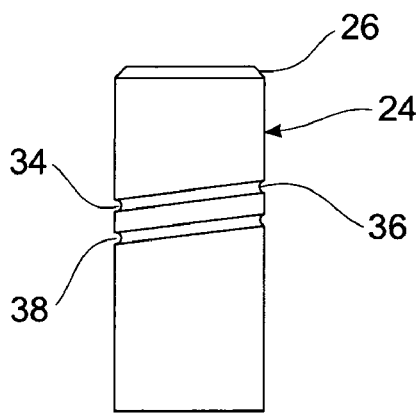
FIG. 23 is a back view of the male joint end.
Figure 24:
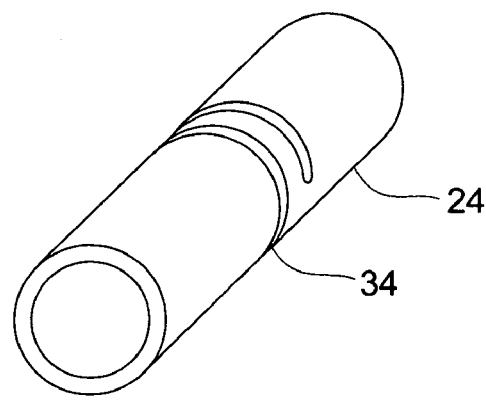
FIG. 24 is a back perspective view of the male joint end.

FIGS. 8 through 16 of the drawings show the female joint end 54. The female joint end 54 consists of an expanded receiving flange 68 connected to a pipe 12 by a pipe to flange taper 56. The female joint end 54 may take many shapes and configurations and may appear as a large diameter pipe including back to back expanded receiving flanges 68 for joining a smaller male pipe end 24 to a smaller male pipe end 24. As best seen in FIG. 16, the pipe to flange taper 56 includes an external starting taper diameter 58, an external ending taper diameter 60, and an internal starting taper diameter 62 and an internal ending taper diameter 64. These diameters define the taper thickness 66.

Figure 9:
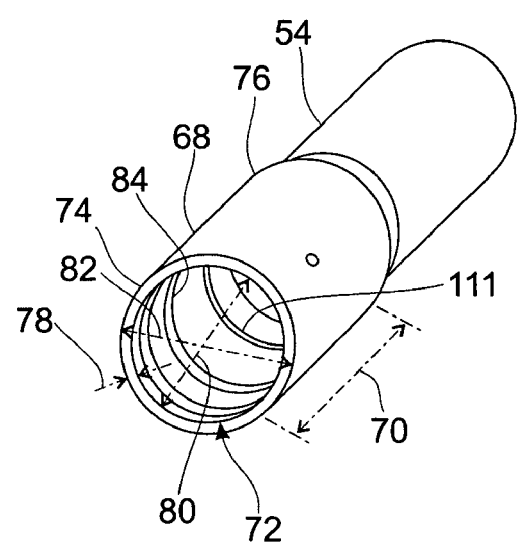
FIG. 9 is a top perspective view of the female joint end.
Figure 10:
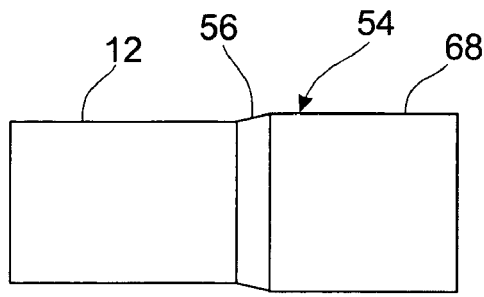
FIG. 10 is a right side view of the female joint end.
Figure 11:
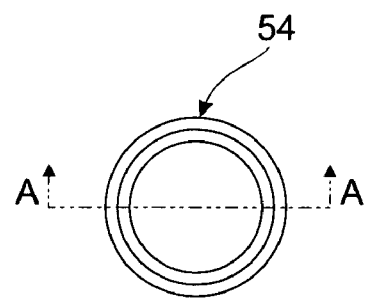
FIG. 11 is a top view of the female joint end.
Figure 12:
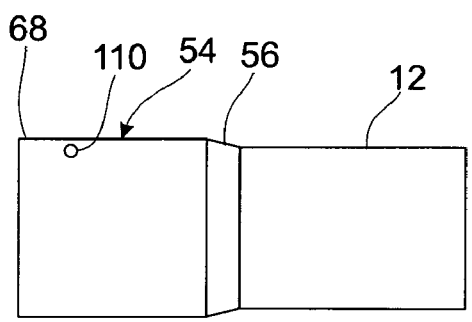
FIG. 12 is a left side view of the female joint end.
Figure 13:
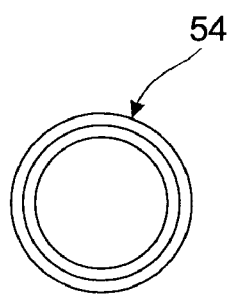
FIG. 13 is a bottom view of the female joint end.
Figure 14:
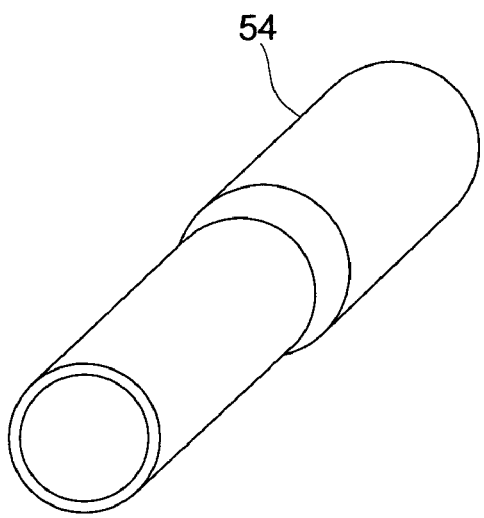
FIG. 14 is a back perspective view of the female joint end.
Figure 15:
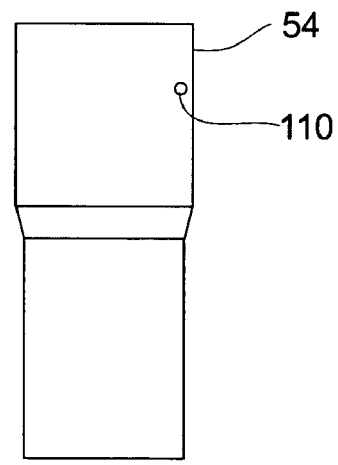
FIG. 15 is a back view of the female joint end.

As seen in FIG. 9, the expanded receiving flange 68 has a flange length 70 leading to an end opening 72. This end opening 72 defines the proximal receiving end 74 of the expanded receiving flange 68. Located inward from the proximal end 74 is a distal section 76. The flange 68 has a flange thickness 78 which is defined by the flange internal diameter 80 and the flange external diameter 82. Located in the distal section 76 is the gasket seat 111.

The flange internal diameter 80 includes a first spiral spline groove section 84. As shown in FIG. 16, the first spiral spline groove section 84 includes a proximal spline end 86 and a distal spline end 88. The threads of this first spline groove section 84 are defined with a first pitch 90, a first one-quarter inch half circle minor diameter 98, a first root 100 at the bottom of the first groove section 84, and a first depth 102 for the threads of the first spline groove section 84. The spiral groove section 84 is machined on the inside of the bell flange 68 with approximately 1½ turns with a one inch pitch. This is for the preferred embodiment shown in FIGS. 8 through 24. FIGS. 1 through 7 and 25 through 32 show an alternative embodiment with 2 full turns with a one inch pitch. The groove section 84 is circular, ¼ inch wide and ⅛ inch deep. The 1½ turns and groove section 84 for the preferred embodiment was chosen for efficiency and ease of installation of the spline 120, but as represented by the alternative embodiment, other pitches, number of turns, and groove sections may be utilized.

FIGS. 17 through 24 of the drawings show the male joint end 24. The male joint end 24 includes a tapered gasket wedge 26 having a wedge angle 28 and may or may not include an initial offset 30. The tapered gasket wedge 26 leads to a gasket seat area 32 that has a surface texture appropriate for sealing with the gasket 112. The male joint end 24 defines the second spiral spline groove section 34 as having an internal end 36, an external end 38. The second spiral spline groove section 34 is defined by a second pitch 40, a second one-quarter inch half circle minor diameter 48, a second root 50, and a second depth 52. The corresponding second groove section 34 is machined in the spigot of the pipe to match first groove section 84. When the bell 68 and spigot 24 are assembled, these grooves 34, 84 form a channel for a spline 120 or locking cord 120 to be inserted.

Figure 5:
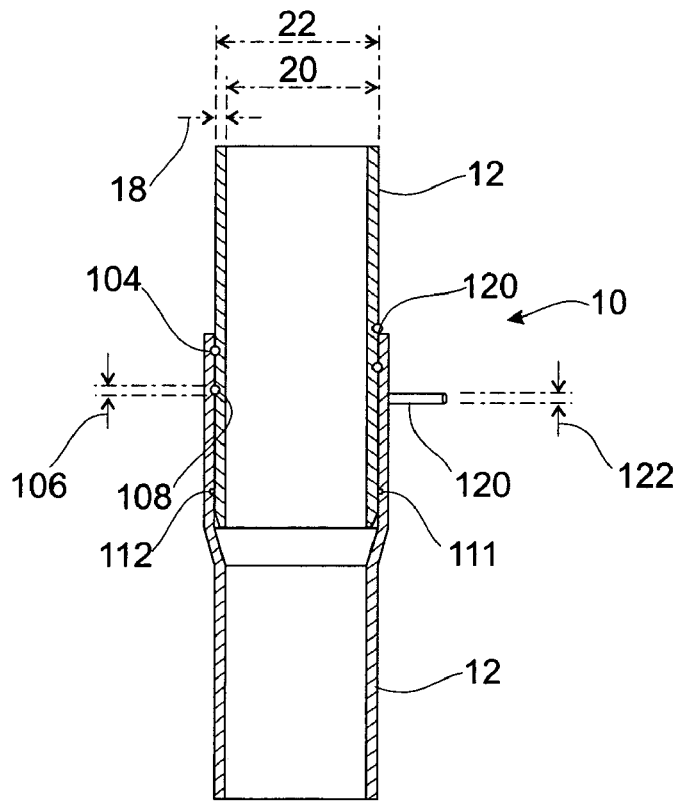
FIG. 5 is a side cutaway view of the embodiment of FIG. 3 along line B—B.

As may be seen in FIG. 5 of the drawing when the first spiral spline groove section 84 and the second spiral spline groove section 34 are properly aligned, they form a spline locking aperture 104. This spline locking aperture 104 is defined by an aperture diameter 106 which has an associated aperture edge 108. The spline locking aperture 104 leads to the exit port 110 which passes through the wall of the female joint end 54. The exit port has a port diameter 113 sized so that a spline 120 in the first spiral spline groove section 84 may pass into the exit port 110 and be locked in position. While the preferred embodiment shows the exit port 110 passing all the way through the female joint end 54, it is also envisioned that an appropriate length could be provided for locking with the exit port 110 without having to pass all the way through the female joint end 54. The preferred embodiment allows the exit port 110 to pass all the way through the female joint end 54 so that a visual check may be made to ensure that the spline 120 has been fully inserted to lock the pipe joint apparatus 10 in position.

Figure 25:
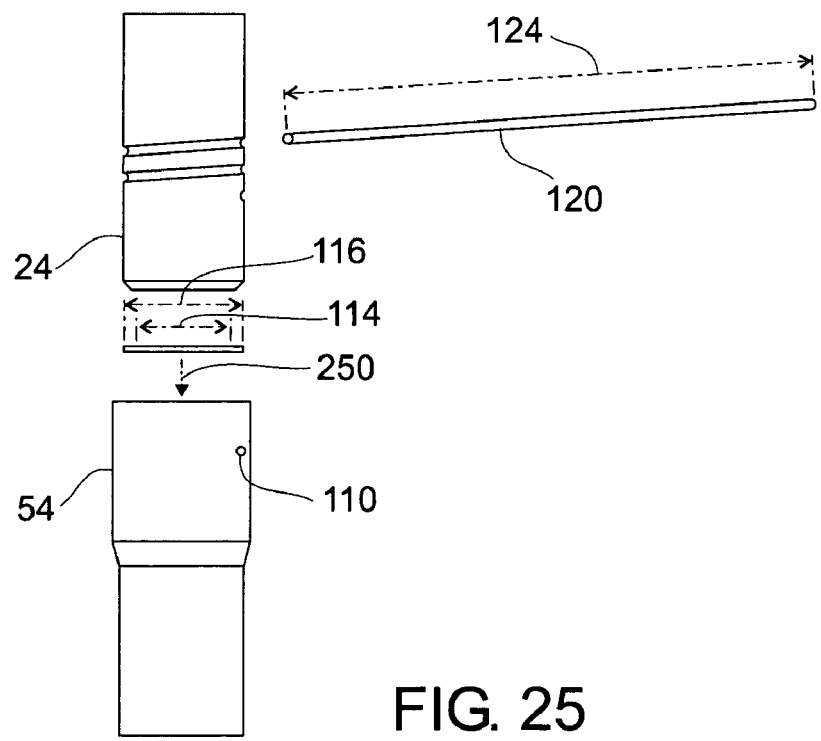
FIG. 25 is an exploded view of the components of the embodiment of FIG. 1 indicating the gasket installation.

FIGS. 25–32 of the drawings show how the components of the pipe joint apparatus 10 are put together. FIG. 25 shows an exploded view of the components before assembly. The gasket insertion arrow 250 indicates the gasket installation into the female joint end 54 as an initial starting point for the assembly of the components. The gasket 112 is inserted into the female joint end 54 and positioned in the gasket seat 111 in the female joint end 54. The gasket 112 has an internal gasket diameter 114 which corresponds to the external diameter 33 of the gasket seat area 32 of the male joined end 24. The gasket 112 has an external gasket diameter 116 which corresponds to the internal seat diameter 115 of the gasket seat 111. The round diameter of the gasket thickness 118 is also designed to correspond with the seat thickness 117 of the gasket seat 111. In the preferred embodiment, the joint 10 is sealed by an O-ring gasket 112 located ½ inch from the bottom of the bell flange 68.

Figure 26:
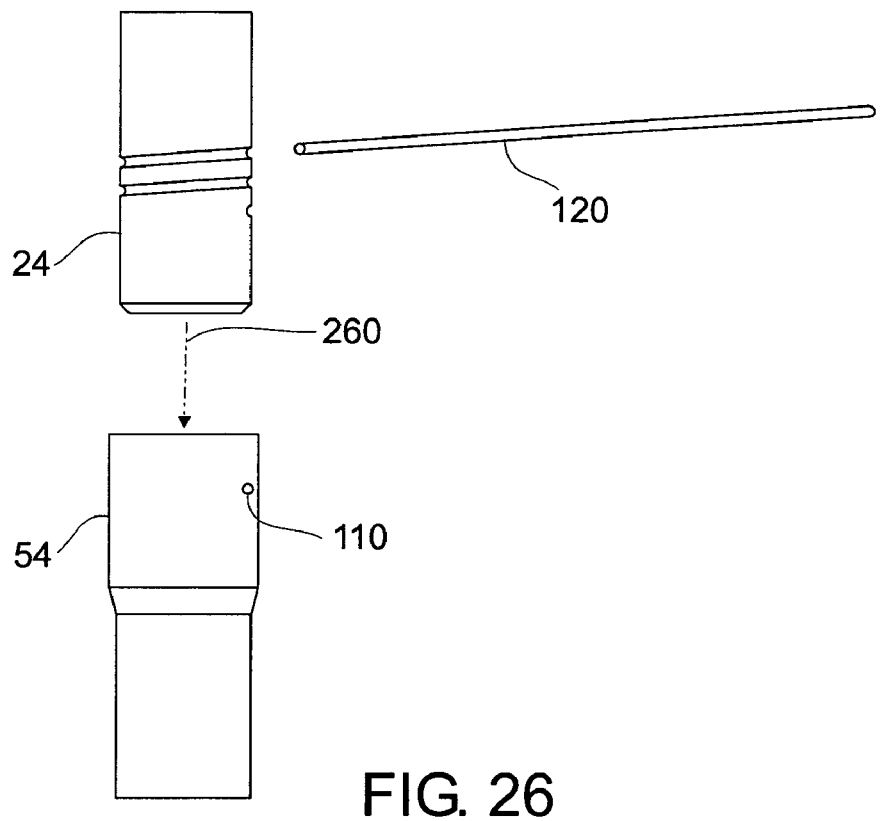
FIG. 26 is an exploded view of the components of the embodiment of FIG. 1 indicating the insertion of the male joint end into the female joint end.
Figure 27:
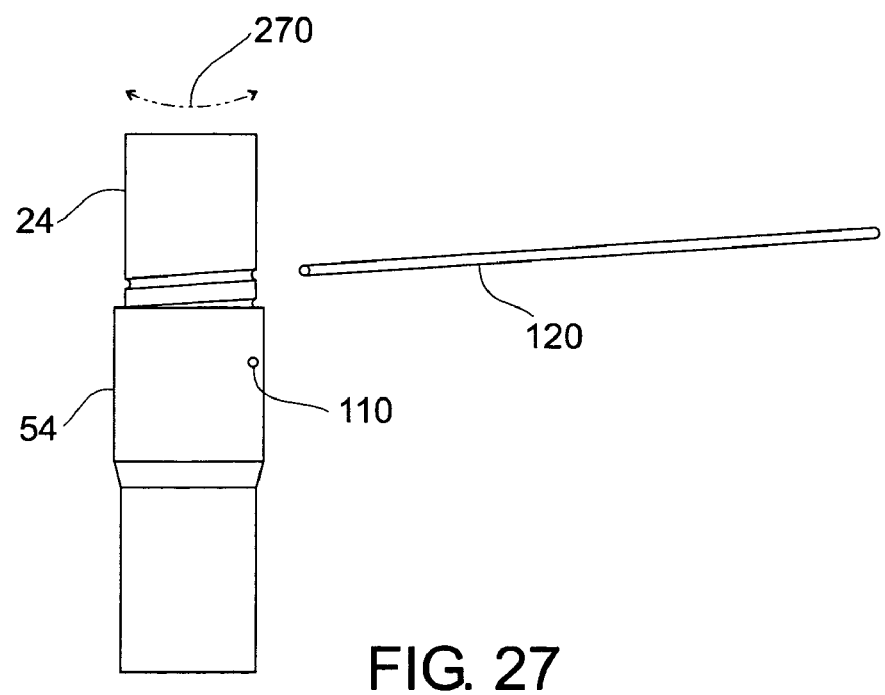
FIG. 27 is an exploded view of the components of the embodiment of FIG. 1 indicating the alignment of the male joint end with the female joint end.

FIG. 26 of the drawings shows how the male joint end 24 is inserted into the female joint end 54 as indicated by male end insertion arrow 260. The spigot end 24 is inserted into the bell flange 68 until the spigot 24 reaches the O-ring 112. FIG. 27 shows the turning or rotation indicated by rotational arrow 270 of the male joint end 24 in the female joint end 54 to achieve alignment of the first spiral spline groove section 84 with the second spiral spline groove section 34 to form the spline locking aperture 104.

Figure 28:
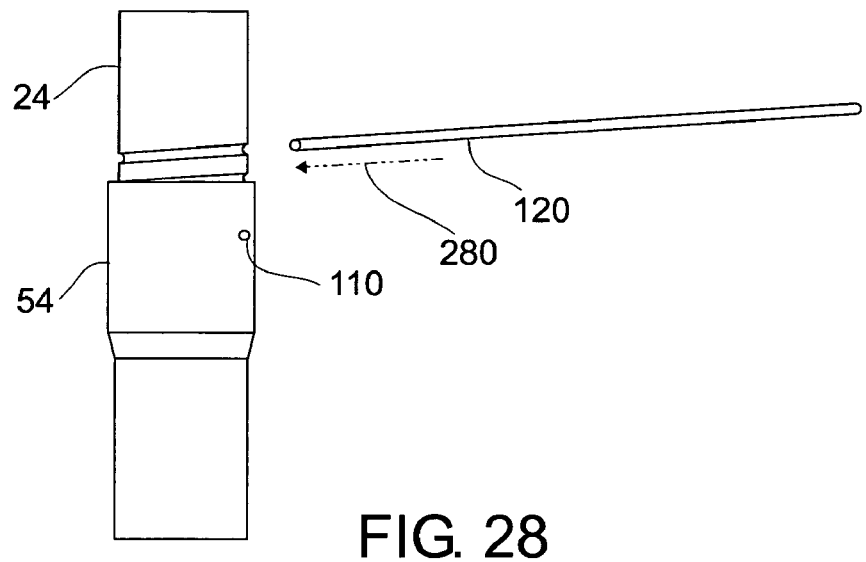
FIG. 28 is an exploded view of the components of the embodiment of FIG. 1 indicating the insertion of the spline into the aligned male joint end and female joint end.

FIG. 28 shows the insertion of the spline 120 into the spline locking aperture 104 as indicated by initial spline insertion arrow 280. The spline 120 is inserted about half way to form a thread. This initial insertion is done by pushing the spline 120 into the spline locking aperture 104 such that it spirals down the spline locking aperture 104 to form threads connecting the male joint end 24 and the female joint end 54.

Figures 29, 30, 31:
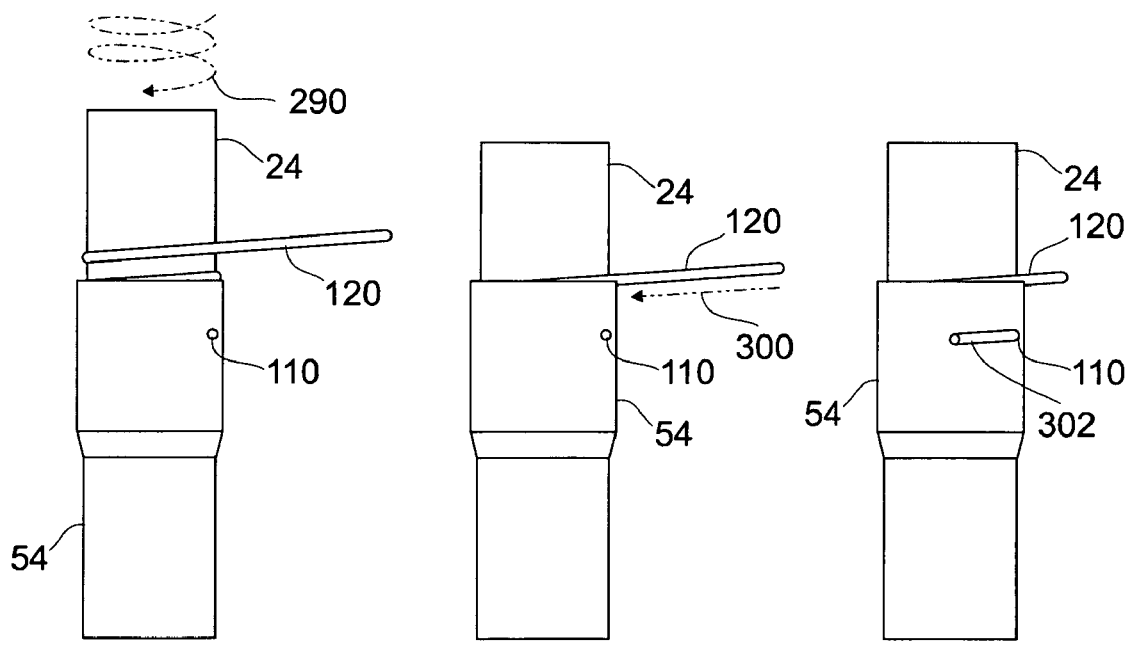
FIG. 29 is a view of the components of the embodiment of FIG. 1 indicating the threaded rotational engagement of the male joint end into female joint end.
FIG. 30 is a view of the components of the embodiment of FIG. 1 indicating the further insertion of the spline to engage the spline locking aperture on the female joint end.
FIG. 31 is a view of the components of the embodiment of FIG. 1 indicating the extension of the spline out of the spline locking aperture on the female joint end.

FIG. 29 shows the threaded engagement arrow 290 showing how the male joint end 24 may utilize the spline 120 as threads within the female joint end 54 to twist the male joint end 24 down into the female joint end 54. By rotating the spigot or male joint end 24 clockwise, the threaded action created by the spline 120 will force the spigot 24 pipe to travel downward and overcome the pressure of the O-ring seal gasket 112.

By using this threaded engagement, the tapered gasket wedge 26 guides the male joint end 24 into the female joint end 54 and the gasket 112 to compresses the gasket 112 into the gasket seat 111 to form a seal between the male joint end 24 and the female joint end 54. This threaded connection allows an easy insertion of the male joint end 24 into the gasket 112 due to the mechanical advantage of the threads formed by the spline 120

FIG. 30 shows the final locking spline insertion arrow 300 indicating how the spline 120 may then be further inserted into the spline locking aperture 104. Once the spigot pipe 24 has been forced to the bottom of the bell 68, the spline 120 is then pushed through the remainder of the grooves 104. Upon reaching the bottom of the grooves 104, the spline 120 will be forced out a hole 110 in the bell 68, located at the end of the groove 104. Once the spline 120 protrudes out the hole 110 in the bell 68, the joint 10 will be locked and unable to unscrew in either direction. The result of this final insertion may be seen in FIG. 31 where the spline 120 extends out of the exit port 110 to form the visual confirmation segment 302 that provides visual confirmation of the locked status for the male joint end 24 and female joint end 54.

Figure 32:
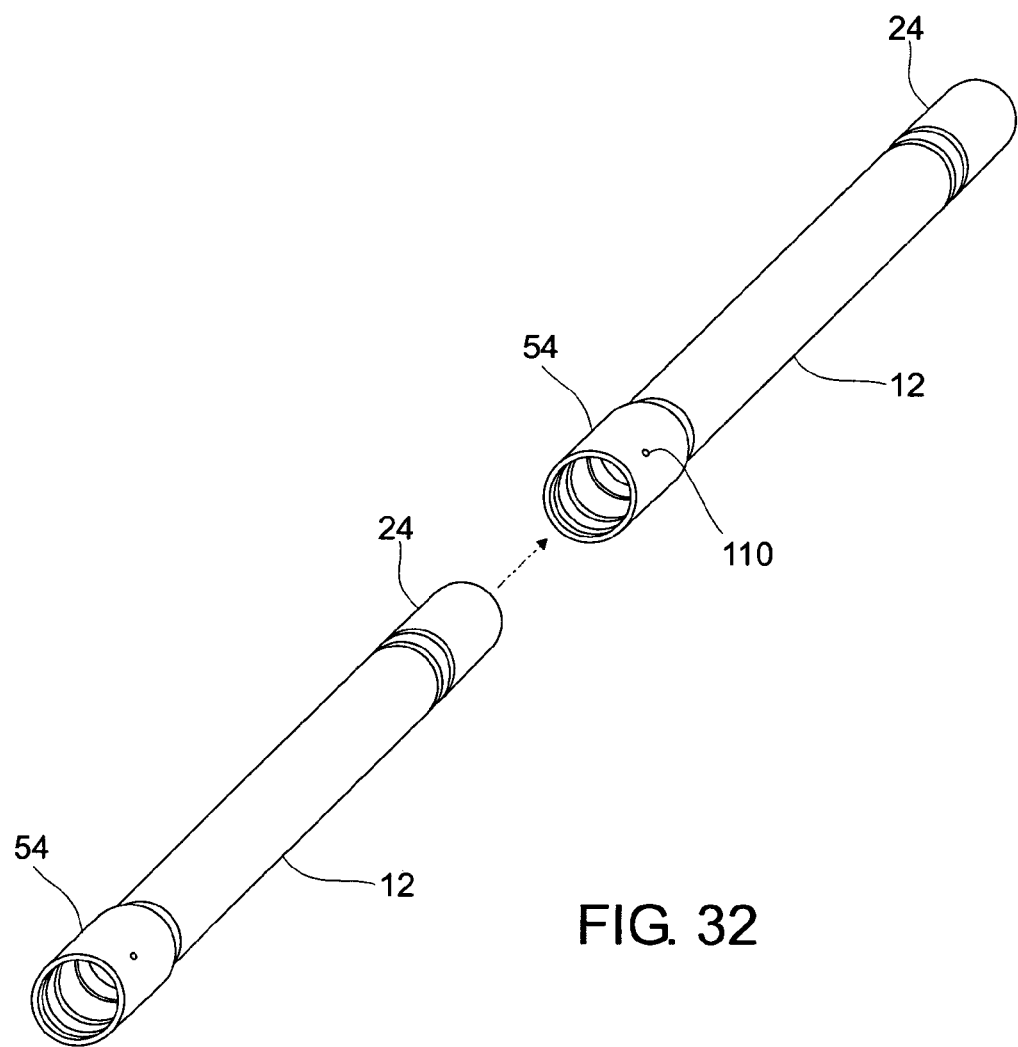
FIG. 32 is a perspective view of two pipes utilizing the joint ends of the present invention.

FIG. 32 of the drawings shows how multiple sections of pipe 12 may utilize male joint ends 24 and female joint ends 54 with the appropriate sealing gaskets 112 to form elongated pipes from individual pipe segments. Obviously, the invention could also utilize pipes having only male pipe ends with a second larger diameter pipe comprising two female pipe ends or other types of configurations. All of these configurations are meant to be embodied by the present invention and should be considered as a part of the present invention.

Advantages of the present invention are found in the following: (1) Spiral grooves result in a strong joint versus a groove cut completely around the pipe and bell. (2) The spiral groove design locks the joint allowing the pipes to be rotated as one unit. Other prior art designs will not lock which allows the pipes to turn independently. (3) The longer bell length of the present invention will not distort when supporting the weight of several pipes. (4) The spiral design of the grooves can be aligned by rotating one pipe, resulting in an easy installation of the spline. (5) Well screens can be directly glued on without the need for an adaptor. (6) The threaded action created by the spiral groove in the spline can be used to overcome the resistance created by the O-ring seal. Normally, this is a problem because the spigot is forced directly into the bell by a single elongated force which is much more difficult to generate and control than the simple force provided by the threaded action.

The descriptive indicators used in the Figures have the following associations:
exiting spiral spline pipe joint apparatus 10
segments of pipe 12
    pipe body 14
    pipe length 16
    pipe thickness 18
    pipe internal diameter 20
    pipe external diameter 22
male joint end 24
    tapered gasket wedge 26
        wedge angle 28
        initial offset 30
    gasket seat area 32
    external surface diameter 33
    second spiral spline groove section 34
        internal end 36
        external end 38
        second pitch 40
        second minor diameter 48
        second root 50
        second depth 52
female joint end 54
    pipe to flange taper 56
        external starting taper diameter 58
        external ending taper diameter 60
        internal starting taper diameter 62
        internal ending taper diameter 64
        taper thickness 66
    expanded receiving flange 68
        flange length 70
        end opening 72
        proximal receiving end 74
        distal section 76
        flange thickness 78
        flange internal diameter 80
        flange external diameter 82
    first spiral spline groove section 84
        proximal spline end 86
        distal spline end 88
        first pitch 90
        first minor diameter 98
        first root 100
        first depth 102
spline locking aperture 104
    aperture diameter 106
    aperture edge 108
exit port 110
    port diameter 113
gasket seat 111
    internal seat diameter 115
    seat thickness 117
gasket 112
    internal gasket diameter 114
    external gasket diameter 116
    gasket thickness 118
spline 120
spline diameter 122
elongated spline length 124
gasket installation arrow 250
male end insertion arrow 260
rotational arrow 270
initial spline insertion arrow 280
threaded engagement arrow 290
final locking spline insertion arrow 300
visual confirmation segment 302

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A method for joining pipes utilizing a spiral spline connection, the method comprising:

providing a male pipe section defining a first half of a spiral spline groove, a female pipe section defining a second half of a spiral spline groove, and a spline having a first end;

inserting the male pipe section into the female pipe section;

aligning the halves of the spiral spline grooves to form a groove aperture;

engaging the first end of the spline with the groove aperture to threadably engage the male pipe section and the female pipe section;

sealing the male pipe section to the female pipe section by providing a gasket and seating the gasket in the female pipe section such that inserting of the male pipe section sealably engages the gasket between the male and female pipe sections; and screwing the pipe sections together to compress the gasket.

2. A method for disengaging a locked spiral spline joint having a male pipe section defining a first half of a spiral spline groove aligned with a female pipe section defining a second half of a spiral spline groove flowably joined to a spline locking aperture, and a spline having at least one exposed end, wherein the male pipe section is threadably locked with the female pipe section by the engagement of the spline with both the aligned halves of the spiral spline grooves and the spline locking aperture, the method for disengaging comprising:

removing the spline from only the spline locking aperture such that the spline remains in engagement with both the aligned halves of the spiral spline grooves to at least temporarily threadably engage the male and female pipe sections; and separating the male pipe section and the female pipe section.

* * * * *